United States Patent [19]

Hagio et al.

[11] Patent Number: 5,174,616
[45] Date of Patent: Dec. 29, 1992

[54] PIPE COUPLING USING SHAPE MEMORY ALLOY

[75] Inventors: Akira Hagio; Yoshimi Ono; Hiroshi Honma, all of Tokyo, Japan

[73] Assignee: NKK Corporation, Tokyo, Japan

[21] Appl. No.: 861,450

[22] Filed: Apr. 1, 1992

Related U.S. Application Data

[62] Division of Ser. No. 445,783, Dec. 4, 1989.

[30] Foreign Application Priority Data

Jul. 14, 1989 [JP] Japan ............................ 1-082143[U]

[51] Int. Cl.$^5$ ............................................. F16L 25/00
[52] U.S. Cl. .................................. 285/381; 285/909; 228/56.3
[58] Field of Search ................ 285/381, 909; 148/402; 420/561, 562; 403/273; 29/859, 446; 439/932; 228/56.3; 174/DIG. 8

[56] References Cited

U.S. PATENT DOCUMENTS

| | | |
|---|---|---|
| 3,525,799 | 8/1970 | Ellis ................................ 228/56.3 |
| 3,957,382 | 5/1976 | Greuel, Jr. et al. . |
| 4,019,925 | 4/1977 | Nenno et al. . |
| 4,035,007 | 7/1977 | Harrison et al. . |
| 4,092,193 | 5/1978 | Brooks . |
| 4,135,743 | 1/1979 | Hughes ............................ 285/381 |
| 4,198,081 | 4/1980 | Harrison et al. . |
| 4,226,448 | 10/1980 | Broylei ............................ 285/381 |
| 4,245,674 | 1/1981 | Nakamura et al. . |
| 4,379,575 | 4/1983 | Martin . |
| 4,384,404 | 5/1983 | Watine . |
| 4,455,041 | 6/1984 | Martin . |
| 4,469,357 | 9/1984 | Martin . |
| 4,657,287 | 4/1987 | Nimke . |
| 4,670,217 | 6/1987 | Henson et al. . |
| 4,695,428 | 9/1987 | Ballentine et al. . |
| 4,806,402 | 2/1989 | Vidakovits . |
| 4,809,901 | 3/1989 | Gen et al. ........................ 228/56.3 |
| 4,832,382 | 5/1989 | Kapgan ........................... 285/381 |
| 4,883,925 | 11/1989 | Graf . |
| 4,894,030 | 1/1990 | Chavaroux ..................... 439/932 |
| 5,015,512 | 5/1991 | Matsumoto .................. 174/DIG. 8 |

FOREIGN PATENT DOCUMENTS

| | | |
|---|---|---|
| 54-4898 | 3/1979 | Japan . |
| 1518788 | 7/1978 | United Kingdom . |
| 2039654 | 8/1980 | United Kingdom . |

Primary Examiner—Eric K. Nicholson
Attorney, Agent, or Firm—Frishauf, Holtz, Goodman & Woodward

[57] ABSTRACT

A pipe coupling comprises a cylindrical coupling member fabricated of shape memory alloy and a foil as a metallic member of low melting point attached to an internal surface of the cylindrical coupling member, a melting point of the foil being lower than that of materials of a pipe to be joined to the pipe coupling and of the coupling member. Further, a pipe coupling comprises a cylindrical coupling member fabricated of shape memory alloy, at least two pieces of ring protrusions formed on an internal surface of the cylindrical coupling member, and metallic member of low melting point which is attached to an internal surface of the cylindrical coupling member between the ring protrusions, a melting point of the metallic member of low melting point being lower than that of materials of a pipe to be joined and of the coupling member. Furthermore, a pipe coupling comprises a cylindrical coupling member fabricated of shape memory alloy, a ring stopper formed at a central portion of the cylindrical coupling member in the axial direction thereof, and metallic member of low melting point attached to an internal surface of the cylindrical coupling member both sides of the ring stopper, a melting point of the metallic member of low melting point being lower than that of materials of a pipe to be joined and of the coupling member.

16 Claims, 2 Drawing Sheets

PIPE COUPLING USING SHAPE MEMORY ALLOY

This is a division of application Ser. No. 07/445,783 filed Dec. 4, 1989.

BACKGROUND OF THE INVENTION

1. Field of the Invention

The present invention relates to a pipe coupling fabricated of shape memory alloy.

2. Description of the Prior Arts

A pipe coupling fabricated of shape memory alloy is disclosed in a Japanese Examined Patent Publication No. 4898/79. A plurality of ring protrusions are installed on an internal clamping surface of cylindrical coupling member of the coupling. Ends of a pipe to be joined to the pipe coupling are inserted into the pipe coupling from both sides of the coupling member. The coupling member contracts in the radial direction by raising a temperature of the coupling member, into which the ends of the pipe have been inserted, to its transition temperature or more and the ring protrusions bite into an external surface of the pipe to be joined to the coupling. In this way, the ends of the pipes are joined to each other.

However, when a pipe is in the following state, a pipe coupling is hard to seal reliably.

a) When the pipe has surface flaws, especially, surface flaws in the axial direction of the pipe.
b) When a seam weld pipe has a small weld reinforcement of a bead and a shape of its toe is not smooth.
c) When a roundness of the pipe is not good.
d) When a tolerance of an outer diameter is large.

Particularly, when a ratio of wall thickness "t" to a diameter "D" of the pipe is large, a reliable seal property is hard to obtain.

In the above-mentioned case, in order that the ring protrusions can bite well into the external surface of the pipe, it is thought that the shape of the ring protrusion is made to be ab acute angle or that a radius of curvature of the pipe is made small. However, even when a hardness of a material of the coupling member is equal to a hardness of the pipe to be joined or slightly over the hardness of the pipe, the ring protrusions themselves are deformed. Consequently, the ring protrusions cannot bite into the external surface of the pipe in order to raise the seal property.

SUMMARY OF THE INVENTION

It is an object of the present invention to provide a pipe coupling having a good seal property.

To accomplish the above-mentioned object, the present invention provides a pipe coupling comprising:

a cylindrical coupling member fabricated of shape memory alloy; and a foil as a metallic member of low melting point attached to an internal surface of said cylindrical coupling member, a melting point of said foil being lower than that of materials of a pipe to be joined to the pipe coupling and of the coupling member, further, the present invention provides a pipe coupling comprising:

a cylindrical coupling member fabricated of shape memory alloy;

at least two pieces of ring protrusions formed on an internal surface of said cylindrical member; and a metallic member of low melting point which is attached to an internal surface of said cylindrical coupling member between said ring protrusions, a melting point of said metallic member of low melting point being lower than that of materials of a pipe to be joined and of the coupling member.

Furthermore, the present invention provides a pipe coupling comprising:

a cylindrical coupling member fabricated of shape memory alloy;

a ring stopper formed at a central portion of said cylindrical coupling member in the axial direction thereof; and a metallic member of low melting point attached to an internal surface of the cylindrical coupling member on both sides of said ring stopper, a melting point of said metallic member of low melting point being lower than that of materials of a pipe to be joined and of the coupling member. The above objects and other objects and advantages of the present invention will become apparent from the detailed description which follows, taken in conjunction with the appended drawings.

DETAILED DESCRIPTION

A Preferred embodiments of the present invention in the case of pipes of stainless steel of SUS 304 which are joined to each other by inserting the pipe ends into a coupling member will be described with specific reference to the appended drawings.

The coupling member to be used is fabricated of shape memory alloy of stainless steel. Components of said alloy are 9 wt. % Cr, 14 wt. % Mn, 6 wt. % Si and 5 wt. % Ni and the rest of the components is Fe. A temperature of heating for causing the coupling member to contract in the radial direction thereof is 300° to 350° C. A metallic member of low melting point which is attached to an internal surface of the coupling member and whose melting point is lower than that of materials of a pipe to be joined and of materials of the coupling member is used. A soft solder of Ag-Sn is used as the metal of low melting point. 3 to 5 wt. % Ag is desired to be contained in the soft solder and the rest of components is desired to be Sn. A melting point of the soft solder is 200° to 250° C. A soft of Ag-Sn-Sb also maybe used.

Figure 1:
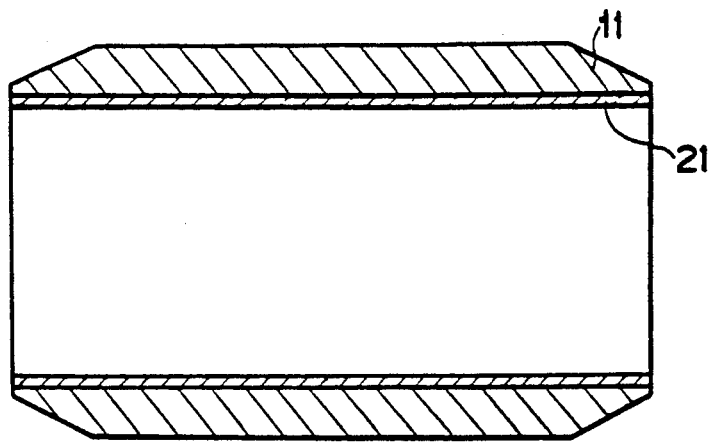
FIG. 1 is a vertical sectional view of a first pipe coupling of the present invention.

FIG. 1 shows a first pipe coupling of the present invention. Foil 21 as a metallic member of low melting point is attached to the internal surface of cylindrical coupling member 11 having a smooth internal surface. A processing cost of the pipe coupling can be reduced compared with that of a pipe coupling having ring protrusions on the internal surface of the prior-art coupling member. Pipes to be joined are inserted from both sides of the coupling member 11, to which foil 21 of low melting point is attached. The coupling member, into which the pipes have been inserted, contracts in the radial direction, upon being heated. The foil of low melting point attached to the internal surface of the coupling member 11 is melted by heating and penetrates into voids between the pipe and the coupling member. Penetrated molten metal is solidified by cooling and a reliable seal can be accomplished.

Figure 2:
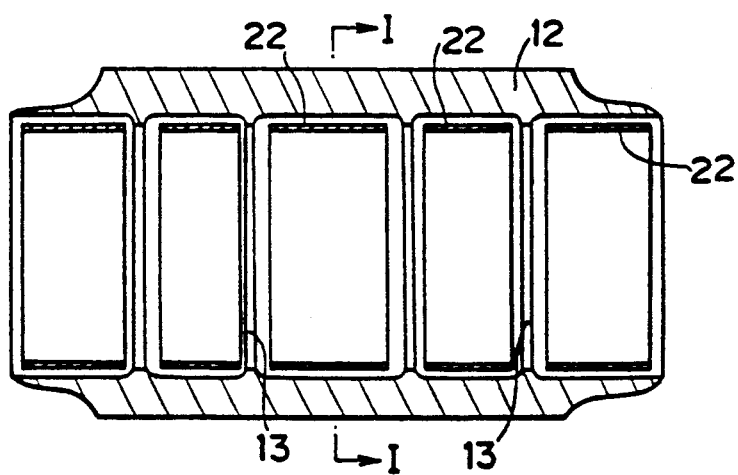
FIG. 2 is a vertical sectional view of a second pipe coupling of the present invention.
Figure 3:
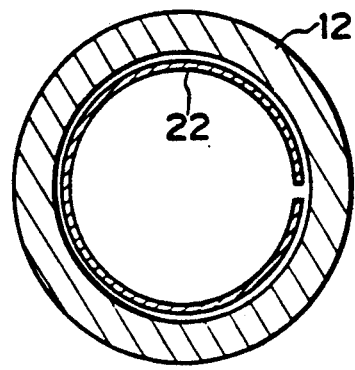
FIG. 3 is a vertical sectional view of the pipe coupling taken on line 1—1 of FIG. 2.

FIG. 2 show a second pipe coupling of the present invention. Four ring protrusions 13 are formed in the axial direction of cylindrical coupling member 12. The ring protrusions 13 are positioned symmetrically relative to the center of a coupling. Metallic members 22 of low melting point are fixed to an internal surface between the ring protrusions 13 and an internal surface of the both ends of the coupling member 12. A section of the metallic member 22 of low melting point has a shape "C" and slits in the axial direction as shown in FIG. 3. The coupling member 12, into which pipe has been inserted, contracts in the radial direction, upon being heated. The metallic member of low melting point is melted by heating and molten metal penetrates into the voids between the pipe and the coupling member. Molten metal penetrates into a portion, into which the ring protrusions have not been able to bite, whereby said portion can be reliably sealed. For example, a portion where there is a flaw in the axial direction pipe can be reliably sealed.

Figure 4:
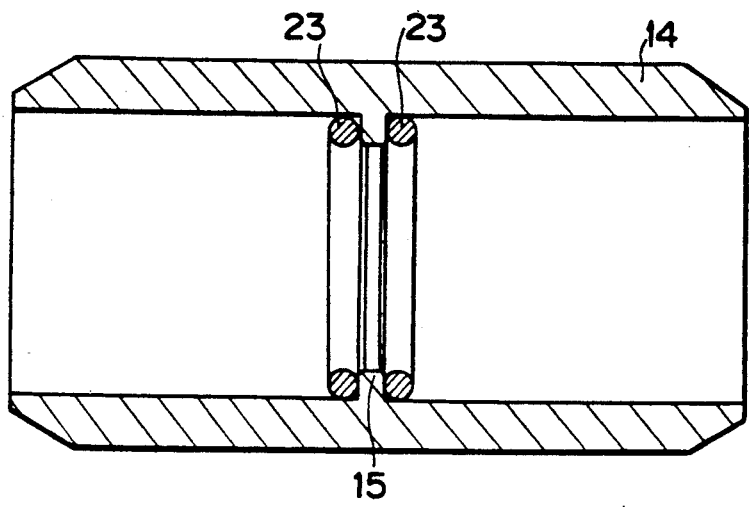
FIG. 4 is a vertical sectional view of a third pipe coupling of the present invention.

FIG. 4 is a vertical sectional view of a third pipe coupling of the present invention. In this pipe coupling, difficulties in pipe couplings as shown in FIGS. 1 and 2 are overcome. That is, the problem is solved that, when pipes to be joined from both sides of a coupling member are inserted into the coupling member, it is hard to adjust the ends of the pipes to be in a central portion of the coupling member. Ring stopper 15 is formed at a central portion of the cylindrical coupling member 14 in the axial direction. Ring metallic member 23 of low melting point are attached to both sides of the stopper 15. The coupling member 14, into which the pipes have been inserted, contracts in the radial direction thereof, upon being heated. The metallic member 23 of low melting point is melted by heating and molten metal penetrates into the voids between the pipe and the coupling member. Even when small voids between the pipe and the coupling member because the pipe to be joined has no roundness, molten metal penetrates into the voids. In consequence, a joint portion can be reliably sealed by a solidification of the molten metal.

Figure 5:
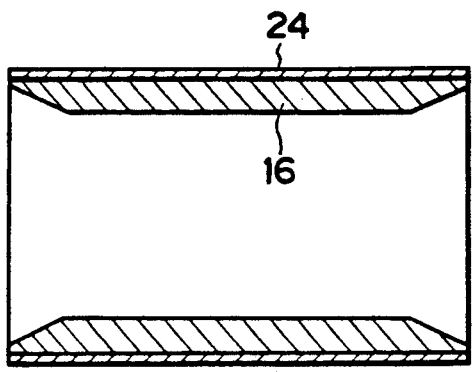
FIG. 5 is a vertical sectional view of a fourth pipe coupling of the present invention.

The case where the pipes are joined by inserting the pipes into the coupling member is described in the above-mentioned examples. This case can be applied to the case where the pipes are joined by inserting the coupling member into the pipes and enlarging a diameter of the coupling member by heating. FIG. 5 shows a pipe coupling in the case where the pipes are joined by inserting the coupling member into the pipes and enlarging a diameter of the coupling member by heating. Reference numeral 16 denotes a cylindrical coupling member and 24 metallic member of low melting point. The above-mentioned case can be applied to the case where coupling members are attached to the inside and the outside of the pipe and the pipes are joined, the pipe being put between two couplings.

The pipe coupling of the present invention as described above can be applied to a pipe to be joined which has no roundness or has flaws in the axial direction. When the pipes are joined by heating the pipe coupling and causing a diameter of the coupling member to contract, the metallic member of low melting point attached to the internal surface of the coupling member is melted and molten metal penetrates into the voids between the pipe and the coupling member by virtue of a capillary phenomenon. Penetrated molten metal is solidified by cooling whereby a joint portion can be reliably sealed.

In the case of an internal pipe coupling or a two-sided pipe coupling also, the same effect as that in the case of the above-mentioned external pipe coupling can be expected.

What is claimed is:

1. A pipe coupling comprising:
    a cylindrical coupling member made from shape memory alloy;
    at least two substantially ring shaped protrusions formed on an internal surface of said cylindrical coupling member; and
    a metallic member of low melting point which is attached to an internal surface of said cylindrical coupling member between said ring shaped protrusions, a melting point of said metallic member of low melting point being lower than that of materials of a pipe to be joined and of the coupling member.

2. The pipe coupling of claim 1, wherein said ring shaped protrusions comprise four pieces of ring protrusions positioned symmetrically relative to the center of the coupling member in the axial direction of the cylindrical coupling member.

3. The pipe coupling of claim 1, which further comprises a metallic member of low melting point attached to an internal surface at the ends of the cylindriacl coupling member.

4. The pipe coupling of claim 1, wherein said metallic member of low melting point has at least one slit therein; and a cross section of said metallic member is C-shaped.

5. The pipe coupling of claim 1, wherein said shape memory alloy is a shape memory alloy of stainless steel.

6. The pipe coupling of claim 1, wherein said metallic member of low melting point is a soft solder of Ag-Sn.

7. The pipe coupling of claim 1, wherein said metallic member of low melting point is a soft solder of Ag-Sn-Sb.

8. The pipe coupling of claim 1, wherein:
    said shape memory alloy is a shape memory alloy of stainless steel;
    said metallic member of low melting point has at least one slit in the axial direction thereof, and has a C-shaped section; and
    said metallic member of low melting point is a soft solder of Ag-Sn.

9. A pipe coupling comprising:
    a cylindrical coupling member fabricated of shape memory alloy;
    a ring stopper formed at a central portion of said cylindrical coupling member in the axial direction thereof; and
    a metallic member of low melting point attached to an internal surface of said cylindrical coupling member on both sides of said ring stopper, a melting point of said metallic member of low melting point being lower than that of meterials of a pipe to be joined and of the coupling member.

10. The pipe coupling of claim 9, wherein said shape memory alloy is a shape memory alloy of stainless steel;

11. The pipe coupling of claim 9, wherein said metallic member of low melting point is a soft solder of Ag-Sn.

12. The pipe coupling of claim 9, wherein said metallic member of low melting point is a soft solder of Ag-Sn-Sb.

13. The pipe coupling of claim 9, wherein:
said shape memory alloy is a shape memory alloy of stainless steel; and
said metallic member of low melting point is a soft of Ag-Sn.

14. The pipe coupling of claim 9, wherein said metallic member is foil.

15. The pipe coupling of claim 1, wherein said cylindrical coupling member fabricated of shape memory alloy contracts in the radial direction thereof upon being heated.

16. The pipe coupling of claim 9, wherein said cylindrical coupling member fabricated of shape memory alloy contracts in the radial direction thereof upon being heated.

* * * * *

UNITED STATES PATENT AND TRADEMARK OFFICE
CERTIFICATE OF CORRECTION

PATENT NO. : 5,174,616

DATED : December 29, 1992

INVENTOR(S) : HAGIO et al

It is certified that error appears in the above-identified patent and that said Letters Patent is hereby corrected as shown below:

Column 1, line 14, delete "a" before "Japanese".

Column 2, line 38, delete "A" before "Preferred".

Column 3, line 8, change "show" to --shows--.

Column 3, line 15, delete "the" before "both".

Column 4, line 34, change "cylindriacl" to --cylindrical--.

Column 5, line 10 (claim 13), after "soft", insert --solder--.

Signed and Sealed this

Fourth Day of January, 1994

BRUCE LEHMAN

*Attest:*

*Attesting Officer*   Commissioner of Patents and Trademarks